(12) United States Patent
Inoue et al.

(10) Patent No.: US 12,346,000 B2
(45) Date of Patent: Jul. 1, 2025

(54) PLANAR OPTICAL WAVEGUIDE DEVICE FOR MEASURING AMPLITUDE PHASE OF SQUEEZED LIGHT

(71) Applicant: Nippon Telegraph and Telephone Corporation, Tokyo (JP)

(72) Inventors: Asuka Inoue, Musashino (JP); Ryoichi Kasahara, Musashino (JP); Takeshi Umeki, Musashino (JP); Osamu Tadanaga, Musashino (JP); Koji Embutsu, Musashino (JP); Nobutatsu Koshobu, Musashino (JP); Takushi Kazama, Musashino (JP); Takahiro Kashiwazaki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 288 days.

(21) Appl. No.: 18/004,591

(22) PCT Filed: Jul. 31, 2020

(86) PCT No.: PCT/JP2020/029463
§ 371 (c)(1),
(2) Date: Jan. 6, 2023

(87) PCT Pub. No.: WO2022/024352
PCT Pub. Date: Feb. 3, 2022

(65) Prior Publication Data
US 2023/0251549 A1    Aug. 10, 2023

(51) Int. Cl.
*G02F 1/365*    (2006.01)

(52) U.S. Cl.
CPC .................................. *G02F 1/365* (2013.01)

(58) Field of Classification Search
CPC ............. G02F 1/365; G02F 1/377; G02F 2/00
See application file for complete search history.

(56) References Cited

U.S. PATENT DOCUMENTS

| 5,113,524 A | 5/1992 | Hirota et al. |
| 10,082,623 B2 * | 9/2018 | Kato .................... G02B 6/2813 |
| 10,498,102 B2 * | 12/2019 | Akasaka ............. H01S 3/06754 |

FOREIGN PATENT DOCUMENTS

| JP | H01-231033 A | 9/1989 |
| JP | H02-93524 A | 4/1990 |

(Continued)

OTHER PUBLICATIONS

Manceau. M, et al. *Detection Loss Tolerant Supersensitive Phase Measurement with an SU (1,1) Interferometer*, Physical Review Letters, 119, (2017), pp. 223604-1-223604-5.

(Continued)

*Primary Examiner* — John Bedtelyon
(74) *Attorney, Agent, or Firm* — Workman Nydegger

(57) ABSTRACT

A planar optical waveguide device which has improved resistance to optical loss and improved stability of the entire system of balanced homodyne detection is realized. An embodiment is an optical waveguide device for measurement of squeezed light using balanced homodyne detection, including an amplifier circuit that is connected to a signal light input port for inputting the squeezed light and performs phase-sensitive amplification, and a multiplexing/demultiplexing circuit that is connected to a local oscillator optical input port and an output of the amplifier circuit, has local oscillator light and the amplified squeezed light incident on the circuit, and outputs the light interfering with each other to two output ports.

8 Claims, 6 Drawing Sheets

(56) References Cited

FOREIGN PATENT DOCUMENTS

| JP | H03-192929 A | 8/1991 |
|---|---|---|
| JP | 2014-123009 A | 7/2014 |
| WO | 2014/017154 A1 | 1/2014 |

OTHER PUBLICATIONS

Takushi Kazama et al., *Phase Sensitive Amplification Using Monolithically Integrated PPLN Waveguide Circuit*, IEEE, 2015, pp. 1-4.
Hideki Tsunetsugu et al., *A Packaging Technique for an Optical 90°-Hybrid Balanced Receiver Using a Planar Lightwave Circuit*, IEEE, 1996, pp. 1-8.
Naoto Takanashi et al., *4-dB Quadrature Squeezing with Fiver-Coupled PPLN Ridge Waveguide Module*, IEEE, 2020, pp. 1-7.

* cited by examiner

PLANAR OPTICAL WAVEGUIDE DEVICE FOR MEASURING AMPLITUDE PHASE OF SQUEEZED LIGHT

TECHNICAL FIELD

The present invention relates to a planar optical waveguide device, and more particularly to a planar optical waveguide device for measuring the amplitude phase of squeezed light using balanced homodyne detection.

BACKGROUND ART

In the related art, a technique for measuring the amplitude and phase of squeezed light is a technique required in a continuous quantity quantum information technique. An orthogonal amplitude squeezed state (referred to as "squeezed light" below) is an important state used as an auxiliary input state necessary for realizing various quantum gates in a continuous quantity quantum information technique. Squeezed light is light with controlled quantum fluctuations of two non-exchangeable physical quantities, and is in a state where quantum fluctuations to one of the non-exchangeable physical quantities are smaller than quantum fluctuations in a coherent state. When such squeezed light is used, for example, quantum entanglement which is the most important operation in quantum information processing can be generated.

Squeezed light is generated using a nonlinear optical phenomenon. Squeezed light is generated by spontaneous parametric down-conversion (SPDC) when a secondary nonlinear optical effect is used. SPDC is a phenomenon in which photons having a high frequency incident on a secondary nonlinear optical medium are converted into two pairs of photons having a low frequency.

In addition, squeezed light is generated by four-wave mixing when a tertiary nonlinear optical effect is used. In the case of four-wave mixing, a new photon pair having a correlation is generated from two photons having an equal frequency. Relatively strong excitation light is required for both SPDC and four-wave mixing, and a part of the excitation light component is converted into squeezed light in a nonlinear optical medium.

In order to realize quantum information processing, studies are currently being conducted to generate squeezed states using various structures and materials, and it is also an important technique to evaluate the squeezing performance of the squeezed states. In order to measure the amplitude phase of the squeezed light, balanced homodyne detection using a spatial optical system is generally used. Because the orthogonal amplitude phase of light can be measured with high sensitivity using a relatively simple measuring system in balanced homodyne detection, it is widely used in the field of light quanta. In the balanced homodyne detection, measurement light of squeezed light and local oscillator light are interfered with by a 50% beam splitter, two output light beams are detected by another photodetector, and amplitude phase information of the measurement light is acquired based on a difference signal. In this measuring method, the amplitude phase information of the signal light is acquired by performing photoelectric conversion on the squeezed light and then performing phase-sensitive amplification thereon in an electric stage.

In the balanced homodyne detection, there is a problem that the squeezed light returns to a coherent state due to optical loss in a pre-stage where the signal is amplified in the electric stage. For this reason, there is a demand for a technique for improving resistance to optical loss by amplifying the signal of the squeezed light in an optical stage. As a method for improving resistance to optical loss, a technique using phase-sensitive amplification is known (for example, see NPL 1). The phase-sensitive amplification is a low-noise optical amplification mechanism utilizing a nonlinear optical effect, and is effective as a method for improving resistance to optical loss.

The balanced homodyne detection by a spatial optical system of the related art has the following two problems.

As [Problem 1], in the balanced homodyne detection, there is a problem that squeezed light returns to a coherent state due to optical loss in a pre-stage where the signal is amplified in the electric stage. For this reason, the resistance to optical loss is improved, and a low-loss configuration is required in the entire system of balanced homodyne detection. In the related art, in balanced homodyne detection used for detecting squeezed light, a configuration including a highly efficient photodetector, a low-loss optical path, etc. has been used in order to reduce loss. On the other hand, in such a configuration, a restriction on the band where squeezed light is detected is a problem.

[Problem 2] is to improve the stability of the spatial optical system for constructing balanced homodyne detection. In the spatial optical system, it is necessary to arrange a large number of optical components such as mirrors and beam splitters with high accuracy. However, it is difficult to maintain the positional relationship between a large number of components in the spatial optical system for a long period of time, and there is a problem in reproducibility of measurement.

CITATION LIST

Non Patent Literature

[NPL 1] Manceau. M, Leuchs. G, Khalili. F, Chekhova. M, "Detection Loss Tolerant Supersensitive Phase Measurement with an SU (1,1) Interferometer," Physical Review Letters, 119, 223604 (2017)

SUMMARY OF INVENTION

An object of the present invention is to realize a planar optical waveguide device that improves resistance to optical loss and improves stability of the entire system of balanced homodyne detection.

In order to achieve such an object, one embodiment of the present invention is an optical waveguide device for measurement of squeezed light using balanced homodyne detection, including an amplifier circuit connected to a signal light input port for inputting the squeezed light, for performing phase-sensitive amplification, and a multiplexing/demultiplexing circuit connected to a local oscillator optical input port and an output of the amplifier circuit, for inputting local oscillator light and the amplified squeezed light and for outputting the light interfering with each other to two output ports.

DESCRIPTION OF EMBODIMENTS

Figure 1:
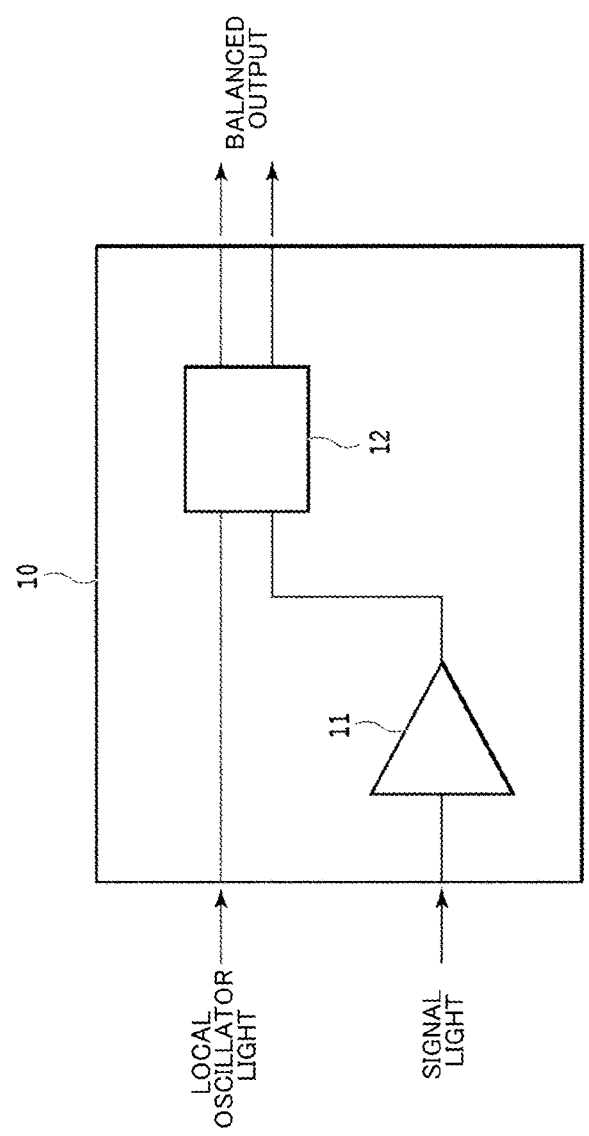
FIG. 1 is a diagram showing a planar optical waveguide device according to an embodiment of the present invention.

Hereinafter embodiments of the present invention will be described with reference to the drawings.

In order to solve the problem of low resistance to loss described in [Problem 1] above, a new method for amplifying squeezed light which is signal light in the optical stage is proposed in this embodiment. In the related art, as optical amplification, there is known an optical amplification mechanism using induced emission of a fiber laser amplifier, a semiconductor laser amplifier, or the like. A fiber laser amplifier amplifies signal light by making excitation light incident on an optical fiber to which rare earth elements such as erbium and praseodymium are added. However, since such optical amplifiers are phase-insensitive amplifying mechanisms and naturally emitted light which is inevitably and randomly generated is mixed totally irrespective of the signal component, a signal-to-noise ratio (S/N ratio) of the signal light before and after amplification is reduced due to the standard quantum limit. Therefore, it cannot be used for amplifying squeezed light having no resistance to optical loss.

For this reason, in the present embodiment, phase-sensitive amplification is used as a method for amplifying squeezed light which is signal light in the optical stage. In phase-sensitive amplification, because spontaneous emission light having an orthogonal phase independent of signals can be suppressed, it is theoretically possible to keep the S/N ratio of signal light unchanged before and after the amplification. In order to amplify only light in the same phase with signal light in phase-sensitive amplification, the phase of signal light needs to match the phase of excitation light or be shifted by n radians as described above. In other words, when a secondary nonlinear optical effect is used, it is necessary that the phase $\varphi_{2ws}$ of excitation light having the wavelength corresponding to the secondary harmonic light and the phase $\varphi_{ws}$ of signal light satisfy the relationship of the following equation 1. Here, n is an integer.

$$\Delta\varphi = 1/2(\varphi_{ws} - \varphi_{ws}) = n\pi \qquad \text{Equation (1)}$$

For the above-described reason, in order to improve optical loss resistance by using phase-sensitive amplification as the optical amplification mechanism, it is necessary to control the phases of excitation light and squeezed light which is signal light with high accuracy.

As nonlinear optical media for performing phase-sensitive amplification, there are a secondary nonlinear optical material represented by a $LiNbO_3$ (LN) waveguide (PPLN) having a periodic polarization inversion structure and a tertiary nonlinear optical material represented by a quartz glass fiber. In the present embodiment, any optical material may be used as long as it is transparent in the wavelength region of the excitation light and the signal light.

In order to solve the problem of stability of a spatial optical system described in [Problem 2] above, the present embodiment proposes an optical integrated circuit in which balanced homodyne detection and the above-mentioned phase-sensitive amplifying mechanism are integrated. By integrating a planar light-wave circuit (PLC) with a planar optical waveguide device, the stability of the entire system of balanced homodyne detection is improved, and at the same time, phase fluctuation is suppressed, and the performance is improved.

FIG. 1 shows a planar optical waveguide device according to a first embodiment of the present invention. The planar optical waveguide device 10 includes an amplifier circuit 11 connected to a signal light input port, and a 50% multiplexing/demultiplexing circuit 12 connected to a local oscillator light input port and the output of the amplifier circuit 10. Squeezed light is input to the signal light input port and is phase-sensitively amplified by the amplifier circuit 11. Local oscillator light and the amplified squeezed light are input to the 50% multiplexing/demultiplexing circuit 12, and interfere with each other, and then are output to two output ports as balanced outputs.

Figure 2:
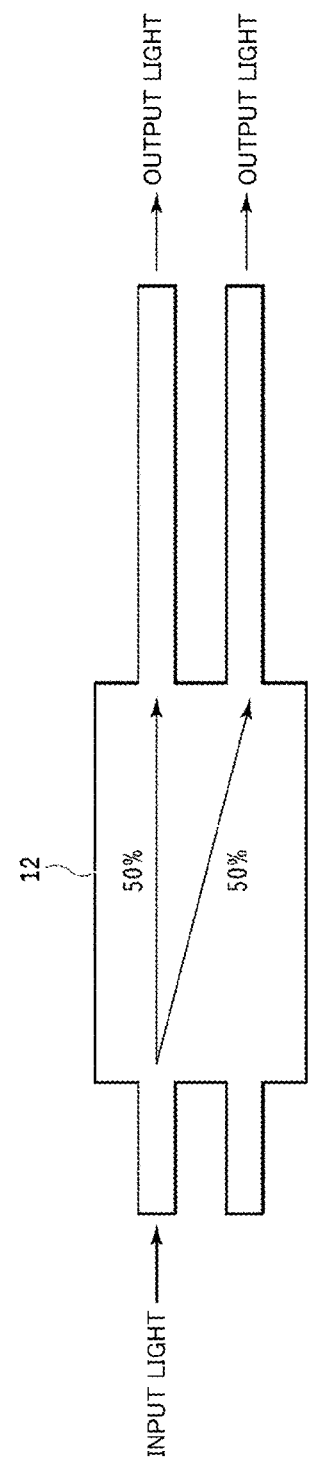
FIG. 2 is a diagram showing a 50% multiplexing/demultiplexing circuit in the planar optical waveguide device of the present embodiment.

FIG. 2 shows the 50% multiplexing/demultiplexing circuit in the planar optical waveguide device of the present embodiment. This is a two-input two-output multi-mode interference coupler circuit. With respect to input light input to one of the input ports, 50% of the optical power is transmitted through the straight port, and the remaining 50% is transmitted through the cross port. Likewise, with respect to input light input to the other input port, 50% of the optical power is transmitted through the straight port, and the remaining 50% is transmitted through the cross port. The local oscillator light is made incident on one input port, the amplified squeezed light is made incident on the other input port, and they interfere with each other and is output to the two output ports.

Further, the 50% multiplexing/demultiplexing circuit may be constructed with not only a multimode interference coupler circuit but also another structure such as a directional coupler type multiplexer/demultiplexer as long as it is an element with an optical power that can be divided by 1:1. Considering machining accuracy, manufacturing tolerance, etc., a multimode interference coupler is suitable for the 50% multiplexing/demultiplexing circuit.

In measurement of squeezed light, the squeezed level can be measured by scanning the phase of local oscillator light. Although a mechanism for scanning the phase of the local oscillator light may be formed outside the planar optical waveguide device, a phase modulation element may be formed inside the element as shown in FIG. 3.

Figure 3:
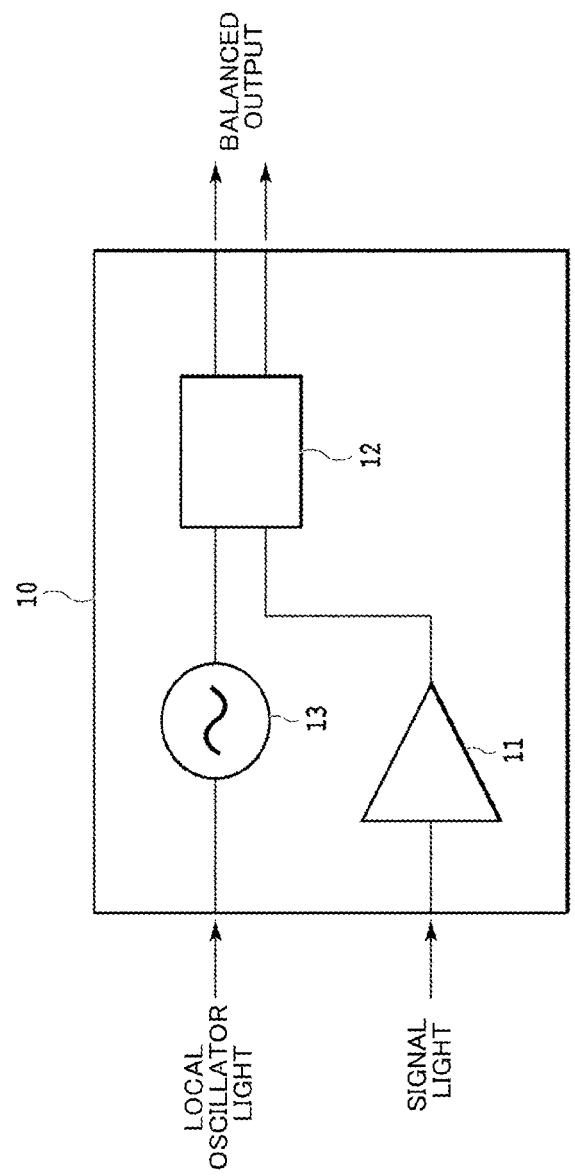
FIG. 3 is a diagram showing a planar optical waveguide device having a phase control mechanism of the present embodiment.

FIG. 3 shows a planar optical waveguide device having a phase control mechanism of the present embodiment. The phase control mechanism 13 is an electro-optic (EO) element in which an electrode is formed along a waveguide between the local oscillator optical input port and the input of the amplifier circuit 10. The EO element changes a refractive index of the waveguide with an electro-optical effect generated by applying an electric field to an electrode formed on the waveguide, and controls the phase of light propagating through the waveguide.

Furthermore, a thermo-optical (TO) element which changes a refractive index with a thermo-optical effect generated by flowing a current to an electrode formed on the waveguide can be used. However, it is believed that the response speed of the TO element is lower than that of the EO element. By manufacturing a phase modulation element inside the planar optical waveguide device, a balanced homodyne detector having an amplification mechanism can be miniaturized.

Figure 4:
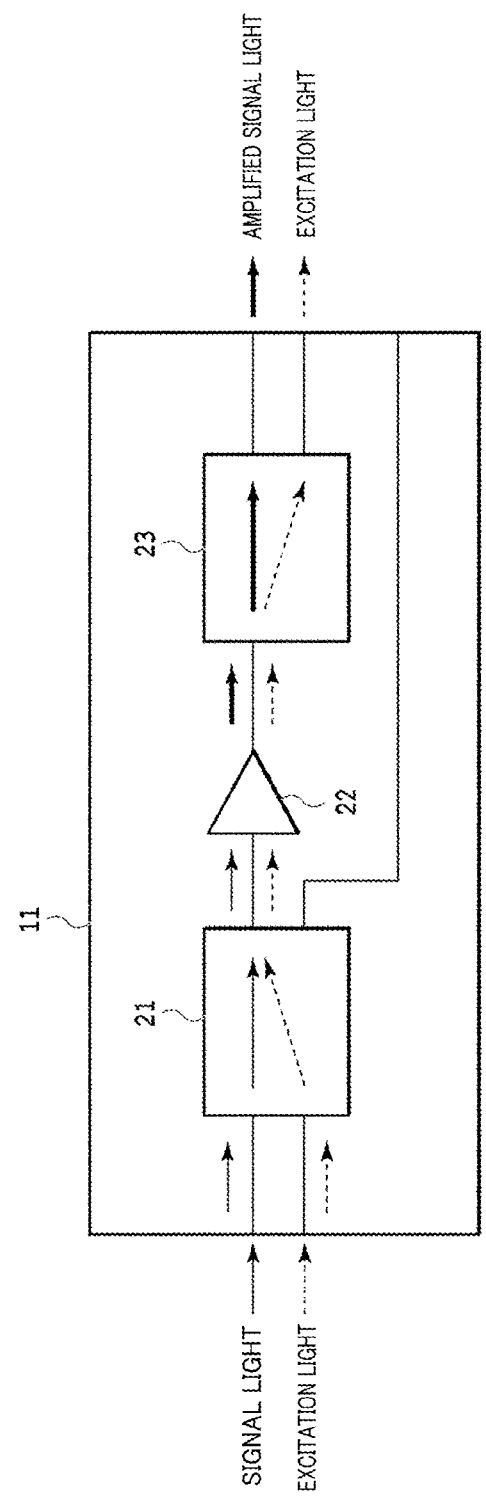
FIG. 4 is a diagram showing an amplifier circuit in the planar optical waveguide device of the present embodiment.

FIG. 4 shows the amplifier circuit in the planar optical waveguide device according to the present embodiment. The amplifier circuit 11 has a multiplexer/demultiplexer 21, a phase-sensitive amplifier 22, and a multiplexer/demultiplexer 23 connected in that order. The phase-sensitive amplifier 22 uses a secondary nonlinear optical medium which is composed of LN and in which a waveguide having a periodic polarization structure is formed. The wavelength of squeezed light which is signal light is set to 1.56 µm, and the wavelength of excitation light is set to 0.78 µm.

The phase-sensitive amplifier 22 of the amplifier circuit 11 performs amplification using phase-sensitive amplification which is a nonlinear optical effect. For this reason, it is necessary to use a nonlinear optical material capable of realizing phase-sensitive amplification, but it is necessary to obtain a large gain with as short an element length as possible for integration. In addition, because excitation light having a shorter wavelength and signal light having a longer wavelength in the phase-sensitive amplification are transmitted through the amplifier circuit 11, it is necessary for the entire amplifier circuit to be transparent in the visible to near-infrared wavelength range. Thus, as the nonlinear optical material, it is preferable to use lithium niobate (LN) or lithium tantalate (LT) having a high secondary nonlinear optical effect and a wider transmission band. Candidates for an optical material include $LiNbO_3$ (LN), $KNbO_3$, $LiTaO_3$ (LT), $LiNb_{(x)}Ta_{(1-x)}O_3$ ($0 \leq x \leq 1$)), or $KTiOPO_4$, or one of these optical materials containing at least one type selected from the group consisting of Mg, Zn, Sc, and In as an additive.

Furthermore, as the difference in refractive index between the core and the cladding of the planar optical waveguide device is greater, the size can be reduced, and the stability of the system is improved. On the other hand, because the influence of manufacturing errors caused by miniaturization becomes serious as well, attention needs to be paid to designing and manufacturing.

Figure 5:
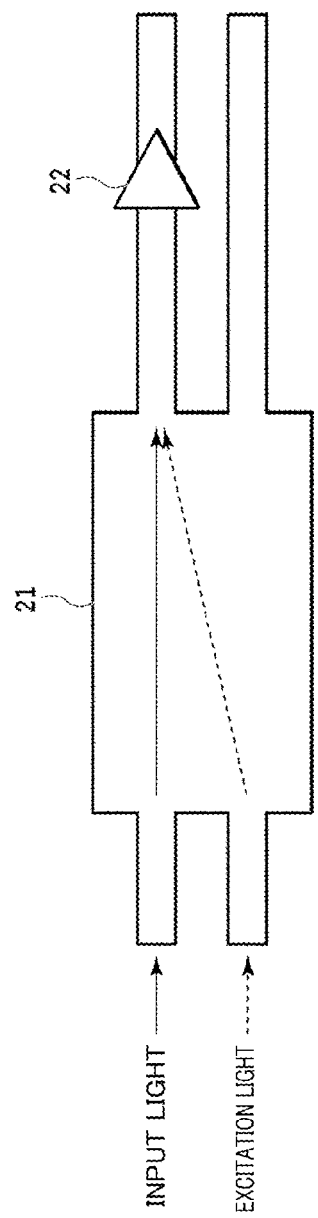
FIG. 5 is a diagram showing a multiplexing/demultiplexing circuit in the amplifier circuit.

FIG. 5 shows the multiplexer/demultiplexer in the amplifier circuit. The multiplexer/demultiplexer 21 and the multiplexer/demultiplexer 22 are two-input and two-output multimode interference coupler circuits. Light in the 1.56 µm band input to the input port is transmitted through the straight port, and light in the 0.78 µm band is transmitted through the cross port. Thus, when signal light in the 1.56 µm band is input to one of the input ports and excitation light in the 0.78 µm band is input to the other port, the signal light and the excitation light are multiplexed and output to one of the output ports.

The squeezed light and the excitation light required for phase-sensitive amplification are made incident on the amplifier circuit 11, and the squeezed light and the excitation light multiplexed by the multiplexer/demultiplexer 21 are made incident on the phase-sensitive amplifier 22 and amplified to have low noise. The output of the phase-sensitive amplifier 22 includes components of the amplified squeezed light and excitation light. The multiplexer/demultiplexer 22 connected to the output of the phase-sensitive amplifier 22 demultiplexes the amplified squeezed light and excitation light, and outputs the light to the two output ports separately.

Further, the multiplexer/demultiplexer 21 and multiplexer/demultiplexer 22 may be constructed not only of a multimode interference coupler circuit but also of another structure such as a directional coupler type multiplexer/demultiplexer.

Figure 6:
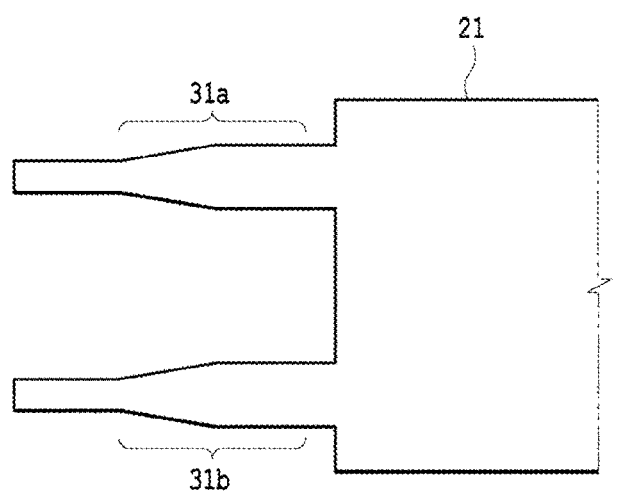
FIG. 6 is a diagram showing a spot-size converter in the planar optical waveguide device.

FIG. 6 shows a spot-size converter in the planar optical waveguide device. It is desirable to provide a spot-size converter (SSC) in the input ports of the multiplexer/demultiplexer 21 and multiplexer/demultiplexer 22 for efficient light coupling. In particular, it is preferable to provide a structure for the input ports of squeezed light to be measured for coupling with low loss. Furthermore, it is more desirable to provide an SSC also in the local oscillator optical input port.

The amplified squeezed light output from the amplifier circuit 11 is made incident on the 50% multiplexing/demultiplexing circuit 12 and is multiplexed with the local oscillator light. The squeezed light and the local oscillator light interfering with each other by the 50% multiplexing/demultiplexing circuit 12 become multiplexed light and are emitted from the two output ports to the outside of the planar optical waveguide device 10. Photodetectors are connected to each of the balance outputs of the planar optical waveguide device 10 to convert the multiplexed light into an electric signal. The output difference between the two photodetectors is measured by an electric spectrum analyzer.

According to the present embodiment, resistance to optical loss can be improved by using phase-sensitive amplification, and the stability of the entire system of balanced homodyne detection can be improved by applying a planar light-wave circuit.

EXAMPLE

The amplitude phase of squeezed light was measured using the planar optical waveguide device having the phase control mechanism shown in FIG. 3. The phase-sensitive amplifier 22 of the amplifier circuit 11 used a secondary nonlinear optical medium which was composed of LN and in which a waveguide having a periodic polarization structure was formed. The wavelength of the squeezed light which was signal light was 1.56 µm, and the wavelength of the excitation light was 0.78 µm.

An optical phase control mechanism 13 was disposed in the waveguide between the local oscillator optical input port and the 50% multiplexing/demultiplexing circuit 12. In the present embodiment, phase control was performed by using an EO element which performed optical modulation resulting from an electro-optical effect of LN by applying an electric field from an electrode provided beside the waveguide.

In a state where the squeezed light was not incident on the signal light input port, the electric signal obtained from the photodetectors indicated shot noise. In the planar optical waveguide device 10 of the present embodiment, as a result of measuring the shot noise and inputting the squeezed light to the signal light input port, it was confirmed that a signal lower than the shot noise was received, and the measurement of the squeezed light was successfully verified.

The invention claimed is:

1. A planar optical waveguide device for measurement of squeezed light using balanced homodyne detection, comprising:
   an amplifier circuit connected to a signal light input port for inputting the squeezed light, for performing phase-sensitive amplification; and
   a multiplexing/demultiplexing circuit connected to a local oscillator optical input port and an output of the amplifier circuit, for inputting local oscillator light and the amplified squeezed light and outputting the light interfering with each other to two output ports.

2. The planar optical waveguide device according to claim 1, wherein the amplifier circuit includes:
   a first multiplexer/demultiplexer configured to multiplex the squeezed light with excitation light,
   a phase-sensitive amplifier connected to the first multiplexer/demultiplexer, for receiving the incident squeezed light and the excitation light and performing phase-sensitive amplification, and a second multiplexer/demultiplexer configured to demultiplex the amplified squeezed light and the excitation light.

3. The planar optical waveguide device according to claim 2, wherein the multiplexing/demultiplexing circuit is a multimode interference multiplexer/demultiplexer or a directional coupler type multiplexer/demultiplexer.

4. The planar optical waveguide device according to claim 2, wherein each of the first multiplexer/demultiplexer and the second multiplexer/demultiplexer is a multimode interference multiplexer/demultiplexer or a directional coupler type multiplexer/demultiplexer.

5. The planar optical waveguide device according to claim 2, wherein a spot-size converter is arranged at the local oscillator optical input port and two input ports of the first multiplexer/demultiplexer.

6. The planar optical waveguide device according to claim 2, wherein the phase-sensitive amplifier is formed of at least one of $LiNbO_3$, $KNbO_3$, $LiTaO_3$, $LiNb_{(x)}Ta_{(1-x)}O_3$ ($0 \leq x \leq 1$)), or $KTiOPO_4$, or one of these optical materials containing at least one type selected from the group consisting of Mg, Zn, Sc, and In as an additive.

7. The planar optical waveguide device according to claim 6, wherein the phase-sensitive amplifier is made of the optical material in which a periodic polarization inversion structure is formed.

8. The planar optical waveguide device according to claim 1, further comprising:

a phase control mechanism inserted between the local oscillator optical input port and the multiplexing/demultiplexing circuit.

\* \* \* \* \*